(12) United States Patent
Belyaev (10) Patent No.: US 8,126,047 B2
(45) Date of Patent: Feb. 28, 2012

(54) VIDEO COMPRESSION AND TRANSMISSION SYSTEM WITH TRANSMITTER SIDE MEMORY RESTRICTION

(75) Inventor: Eugeniy Belyaev, St. Petersburg (RU)

(73) Assignee: Intel Corporation, Santa Clara, CA (US)

( * ) Notice: Subject to any disclaimer, the term of this patent is extended or adjusted under 35 U.S.C. 154(b) by 1104 days.

(21) Appl. No.: 11/959,748

(22) Filed: Dec. 19, 2007

(65) Prior Publication Data

US 2009/0161751 A1 Jun. 25, 2009

(51) Int. Cl.
*H04N 7/12* (2006.01)

(52) U.S. Cl. .................................................. 375/240.01

(58) Field of Classification Search ............... 358/1.15; 382/166, 240, 248; 375/240.01
See application file for complete search history.

(56) References Cited

U.S. PATENT DOCUMENTS

| 6,778,709 B1* | 8/2004 | Taubman | 382/240 |
| 7,200,277 B2* | 4/2007 | Joshi et al. | 382/248 |
| 2003/0090709 A1* | 5/2003 | Rijavec | 358/1.15 |
| 2006/0204086 A1* | 9/2006 | Gargi | 382/166 |

* cited by examiner

*Primary Examiner* — Derrick Ferris
*Assistant Examiner* — Gbemileke Onamuti
(74) *Attorney, Agent, or Firm* — Carrie A. Boone, P.C.

(57) ABSTRACT

A video compression and transmission system that uses a novel rate-distortion algorithm is disclosed. The video compression and transmission scheme is a modification of the JPEG 2000-based video transmission systems for constant bit-rate channels.

8 Claims, 9 Drawing Sheets

VIDEO COMPRESSION AND TRANSMISSION SYSTEM WITH TRANSMITTER SIDE MEMORY RESTRICTION

TECHNICAL FIELD

This application relates to video compression and transmission.

BACKGROUND

The transmission of real-time video over wired/wireless channels is increasingly desirable. The transmission system should provide a maximum visual quality for channels with limited capacity while being implemented in devices with limited memory size (where the total memory size of the transmitter is less than the size of the input picture). An image/video coding standard known as JPEG 2000 is a good solution for this task because it provides rate control with a high accuracy level. (ITU-T and ISO/IEC JTC 1, JPEG 2000 Image Coding System: Core Coding System, ITU-T Recommendation T.800 and ISO/IEC 15444-1, JPEG 2000 Part 1, 2000.)

The use of JPEG 2000 may be problematic, however. Where the memory size is restricted (the normal case), the input picture is preferably split into small fragments (tiles), such that each tile may be compressed separately. The original JPEG 2000 rate-control implementation provides approximately an equal bit-size for each compressed tile. But visual quality of the decoded tiles may be rather different. For example, in some implementations, the quality of the reconstructed image may be inconsistent. For example, in the image 50 of FIG. 4, some decoded tiles have a "good" visual quality, while others have a "very bad" visual quality.

Thus, there is a need for a video compression and transmission scheme to overcome the shortcomings of the prior art.

BRIEF DESCRIPTION OF THE DRAWINGS

The foregoing aspects and many of the attendant advantages of this document will become more readily appreciated as the same becomes better understood by reference to the following detailed description, when taken in conjunction with the accompanying drawings, wherein like reference numerals refer to like parts throughout the various views, unless otherwise specified.

DETAILED DESCRIPTION

In accordance with the embodiments described herein, a video compression and transmission system and method are disclosed. The video compression and transmission scheme is a modification of the JPEG 2000-based video transmission systems for constant bit-rate channels.

Figure 1:
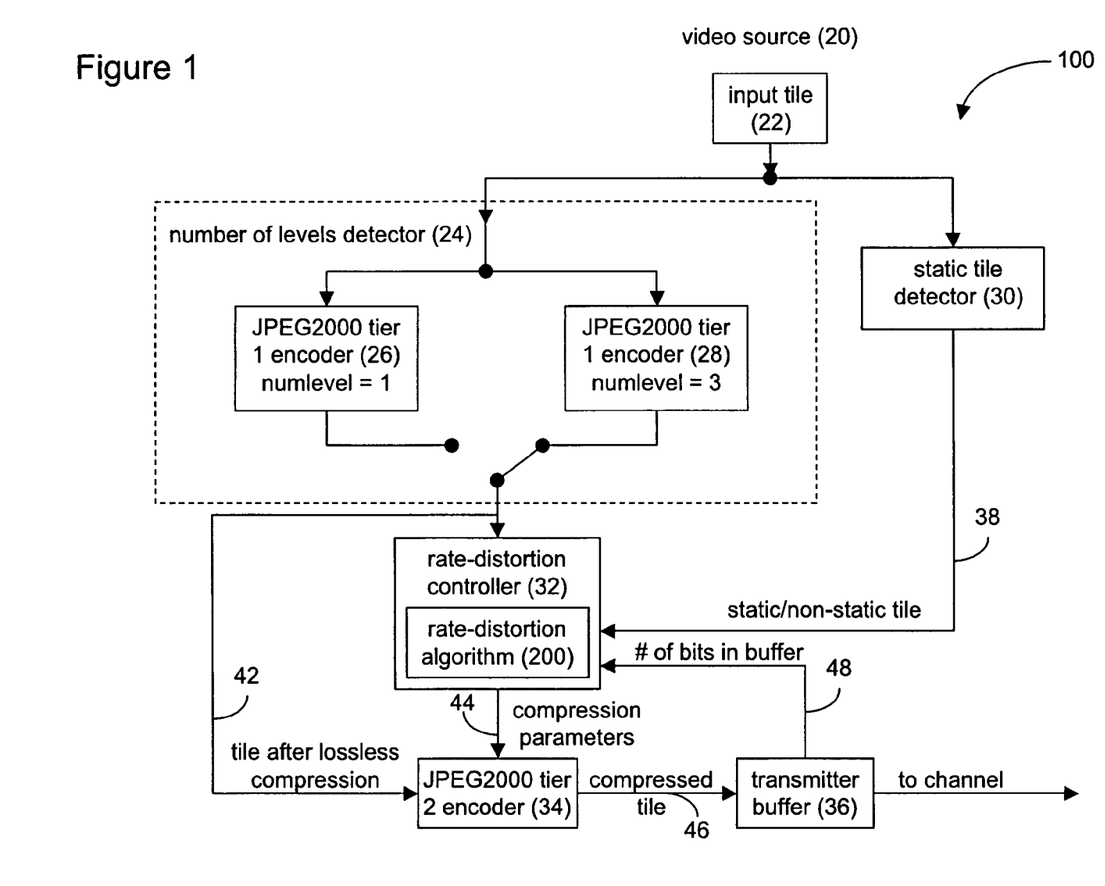
FIG. 1 is a block diagram of a video compression and transmission system, according to some embodiments.

A novel video compression and transmission system 100 is depicted in FIG. 1, according to some embodiments. An input tile 22 is received from a video source 20, to enter a number of levels detector 24, which includes two encoders 26 and 28. Depending on the tile content (desktop or video), the video compression and transmission system 100 chooses a number of levels of wavelet-transform decomposition. As used herein, desktop content refers to non-natural images, text computer graphics, and synthetic images. For example, a desktop icon is a type of desktop content. Video content refers to natural images, such as those found in photographs (e.g., JPG) and streaming video (e.g., movie image). In some embodiments, the number of levels detector 24 uses a simple implementation of a spatial-adaptive wavelet transform.

The JPEG2000 tier 1 encoder 26 and the JPEG2000 tier 1 encoder 28 use wavelet discrete transforms (DWT), where "tier 1" refers to lossless compression. In some embodiments, a single level is sufficient for desktop content while three levels is good for video content. Thus, the number of levels detector 24 includes two different encoders, with the encoder 26 having one level DWT and the encoder 28 having three levels DWT. After encoding, the bit stream with the smaller size is chosen.

The input tile 22 is also received into a static tile detector 30, which compares the current tile hash-function value with a hash-function value of a tile from a previous frame of the video source 20. By comparing the hash function value of the input tile 22 to a hash function value of a previous tile, the static tile detector 30 determines whether the tile is non-static (changing) or static (unchanging). Such information is useful for further processing by the video compression and transmission system 100.

The video compression and transmission system 100 further includes a rate-distortion controller 32, a transmitter buffer 36, and a third encoder 34, a JPEG2000 tier 2 encoder. The rate-distortion controller 32 determines the compression parameters for the current tile 22, using a rate-distortion algorithm 200. These parameters depend on the number of bits in the transmitter buffer 48 as well as the result from the static tile detector 30, that is, whether the tile has been deemed static or non-static (dynamic). The JPEG2000 tier 2 encoder 34 receives the input tile 22 after lossless compression by the number of levels detector 24 and the compression parameters 44 from the rate-distortion controller 32, packages the tile 22 into data units, called packets, and places a compressed tile 46 representative of the input tile 22 into the transmitter buffer 36.

It is assumed herein that the memory size at the receiver is greater than the number of bits for one input frame of video source 20. Therefore, the receiver can "copy" and reproduce the corresponding tile from the previous frame.

In FIG. 1, the video compression and transmission system 100 includes the rate-distortion controller 32, which executes a rate-distortion algorithm 200, in some embodiments. The rate-distortion algorithm 200 is described in more detail in the flow diagrams of FIGS. 2A and 2B, described further below.

Each tile is composed of an integer number of code blocks with numbers i=1, 2, 3 . . . . Each block is subsequently composed of an integer number of coding passes. Each additional pass contributes some bytes to the block and, in turn, decreases the overall tile distortion. The task of the rate-distortion controller 32 is to decide which passes are to be included in the resulting code stream, or, more specifically, to find the set of truncation points $\{n_i\}$ that satisfy the above requirements. Consider $n=\{n_i\}$ to be a truncation vector, where $n_i$ signifies that $i^{th}$ block is truncated in the point number, $n_i$. The truncation vector is a compression parameter for the JPEG2000 tier 2 encoder 34. The overall tile distortion after the truncation is denoted as $$d(n) = \sum_i d_i^{n_i},$$

where the quantity, $d_i^{n_i}$ corresponds to the distortion value of $i^{th}$ block truncated in the point number, $n_i$. Similarly, the resulting tile rate is denoted as $$r(n) = \sum_i r_i^{n_i}.$$

In some embodiments, the video compression and transmission system 100 executes a static optimization algorithm for the case when all the tiles in the current frame are static. If all the tiles in the current frame are static, two possible solutions exist. In the first solution, the rate-distortion controller 32 sends a "copy" command to the receiver. In this case, the corresponding tile with distortion $d(x_{t-L})$ from the previous frame is reproduced on the receiver side, where L represents the number of tiles in the current frame, $x_{t-L}$-truncation vector which was used for tile t−L. For this solution, the video compression and transmission system 100 empties the transmitter buffer 36 without buffer accumulation. In the second solution, the tile is transmitted to the rate-distortion controller 32 with $d_{lossless}$ distortion (which corresponds to visual lossless encoding). Thus, the static optimization algorithm finds a solution for the following optimization task:

$$\begin{cases} \text{minimize} \sum_{t=t_0}^{t=t_0+L} d_t, \\ b_{static}(t) < B_L \end{cases}$$

where $d_t \in \{d_{lossless}, d(x_{t-L})\}$ represents the distortion for the tile t, $b_{static}(t)$ represents the number of bits in the buffer, and $B_L$ represents the buffer threshold, $t_0$—number of first tiles in the frame. As result, for each tile t, there may be a set of distortion values, $d_t$, and a number of bits in the transmitter buffer, $b_{static}(t)$. Before compression of the current frame, the video compression and transmission system 100 finds a solution for the above optimization task, in some embodiments. This solution is used for frame compression with static and non-static tiles (as noted below).

Figure 2A:
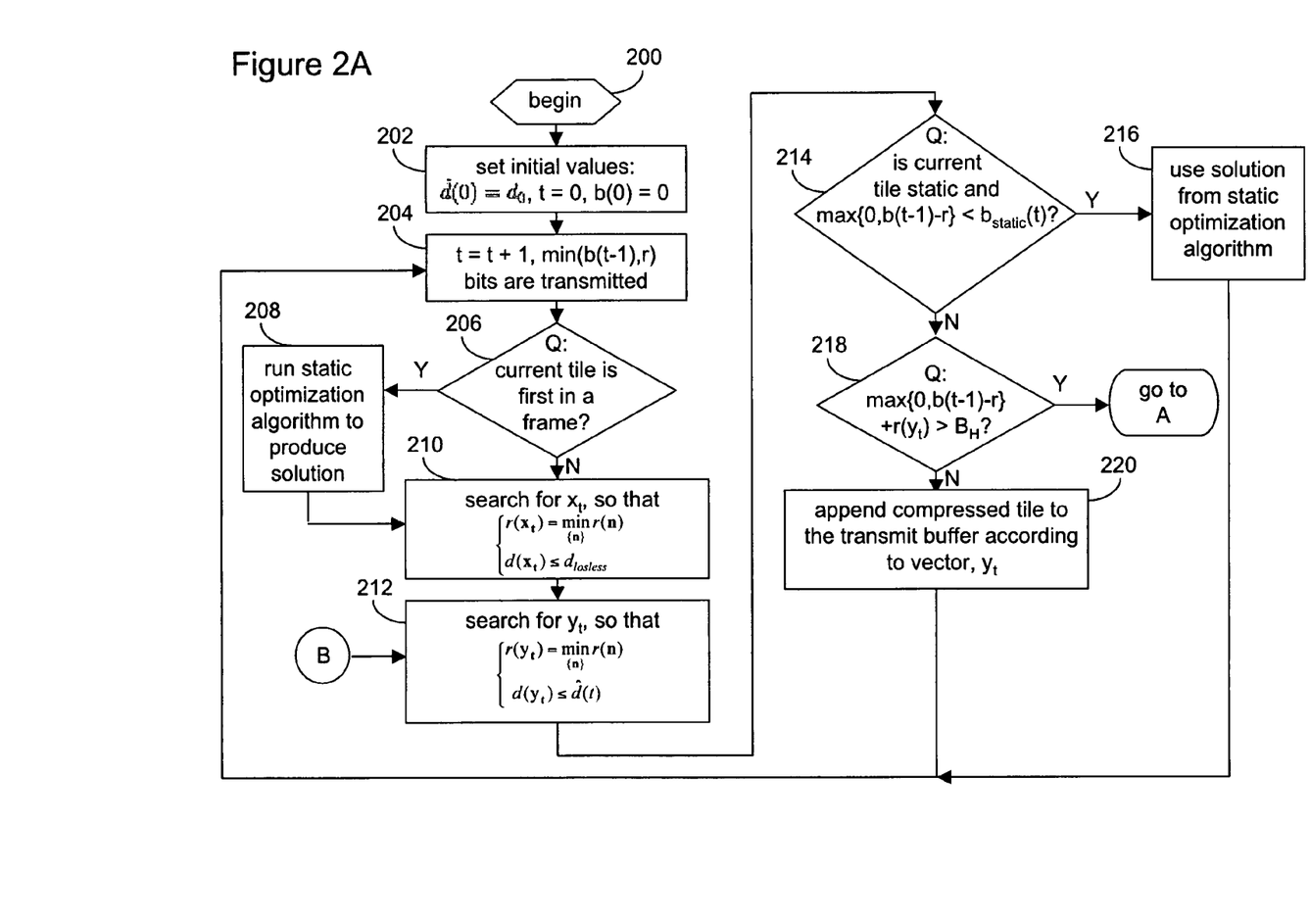
FIGS. 2A and 2B are flow diagrams showing operation of a rate-distortion algorithm used by the video compression and transmission system of FIG. 1, according to some embodiments.
Figure 2B:
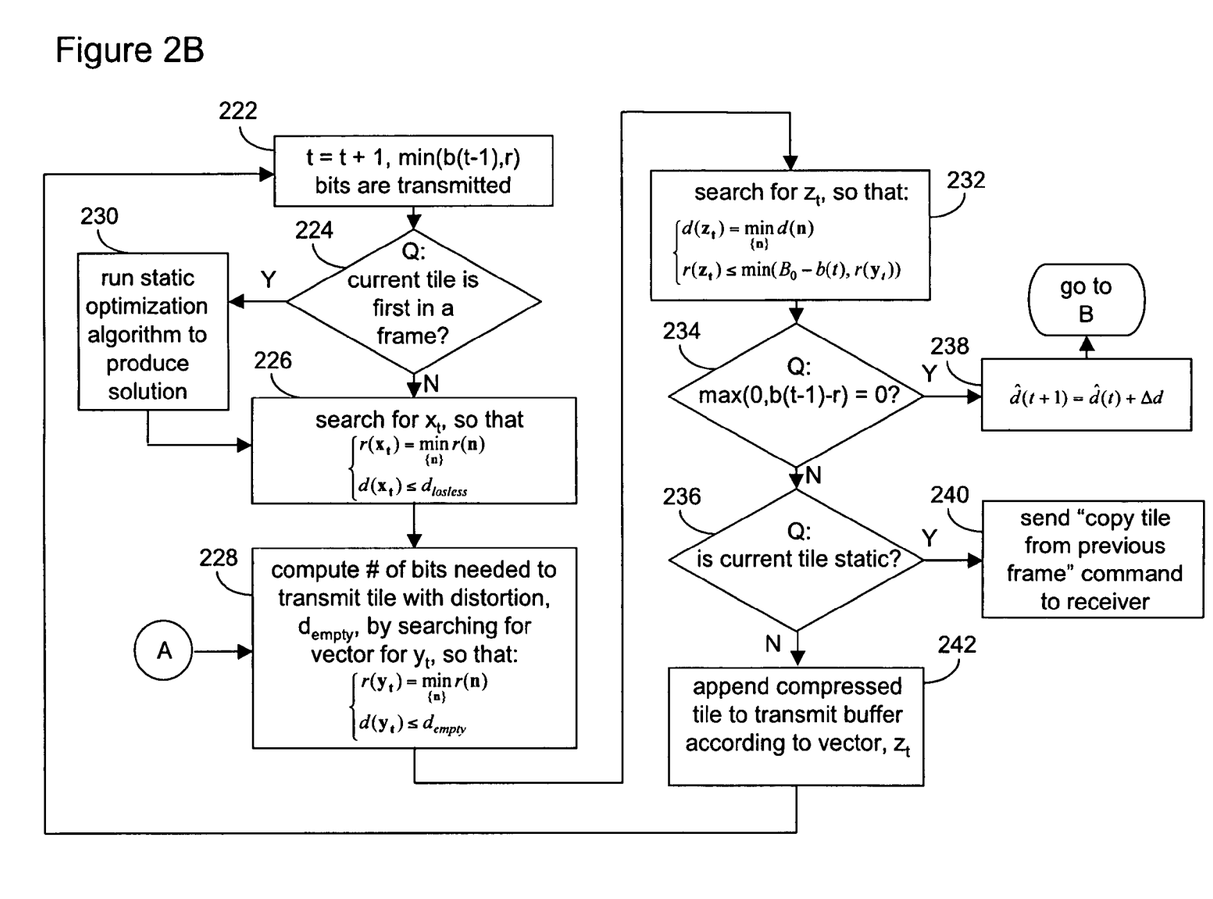

FIGS. 2A and 2B are flow diagram showing operation of the rate-distortion algorithm 200 of the video compression and transmission system 100 of FIG. 1, according to some embodiments. The rate-distortion algorithm 200 begins (FIG. 2A) by initializing variables, $\hat{d}(0)=d_0, t=0, b(0)=0$. (block 202). Next, t is incremented, t=t+1, and min(b(t−1), r) bits are transmitted (block 204).

The rate-distortion algorithm 200 next inquires whether the current tile 22 is the first tile in a frame (block 206). If so, the static optimization algorithm, described above, is run (block 208). Otherwise, a search is made for truncation vector, $x_t$, so that $$\begin{cases} r(x_t) = \min_{\{n\}} r(n) \\ d(x_t) \leq d_{lossless} \end{cases}$$

(block 210), and a search is made for truncation vector, $y_t$, so that $$\begin{cases} r(y_t) = \min_{\{n\}} r(n) \\ d(y_t) \leq \hat{d}(t) \end{cases}$$

(block 212). The rate-distortion algorithm 200 inquires whether the current tile 22 is static and max$\{0,b(t-1)-r\}<b_{static}(t)$ (block 214). If so, the solution from running the static optimization algorithm (block 208) is used (block 216) and the process repeats, starting with incrementing t (block 204). Otherwise, the rate-distortion algorithm 200 makes another inquiry, this time determining whether max$\{0,b(t-1)-r\}+r(y_t)>B_H$ (block 218). If so, the algorithm 200 proceeds to the next part of the algorithm (FIG. 2B), where a bit computation is made (block 232), as described below. Otherwise, the compressed tile is appended to the transmit buffer 36 according to a vector, $y_t$ (block 220), and the process repeats, starting with incrementing t (block 204).

Where max$\{0,b(t-1)-r\}+r(y_t)>B_H$ is true (block 218), the rate-distortion algorithm 200 computes the number of bits that are needed to transmit the tile with distortion $d_{empty}$ by searching for the vector for $y_t$, so that $$\begin{cases} r(y_t) = \min_{\{n\}} r(n) \\ d(y_t) \leq d_{empty} \end{cases}$$

(block 228). Then, the algorithm 200 searches for $z_t$, so that $$\begin{cases} d(z_t) = \min_{\{n\}} d(n) \\ r(z_t) \leq \min(B_0 - b(t), r(y_t)) \end{cases}$$

(block 232). If max$(0,b(t-1)-r)=0$ (block 234), then $\hat{d}(t+1)=\hat{d}(t)+\Delta d$ (block 238), and the algorithm 200 proceeds to search for $y_t$ again (block 240). Otherwise, another inquiry is made, this time whether the current tile 22 is static (block 236). If so, the rate-distortion algorithm 200 sends a command to the receiver, "Copy tile from previous frame" (block 240). Otherwise, the algorithm 200 appends the compressed tile to the transmitter buffer according to the vector, $z_t$, (block 242). Next, t is incremented, t=t+1, and min(b(t−1),r) bits are transmitted, as in block 204 (block 222). If the current tile is the first in the frame (block 224), the static optimization algorithm is run to produce a solution (block 230). Otherwise, the rate-distortion algorithm 200 searches for truncation vector, $x_t$, so that $$\begin{cases} r(x_t) = \min_{\{n\}} r(n) \\ d(x_t) \le d_{lossless} \end{cases}$$

(block 226). The above process is then repeated.

The rate-distortion algorithm 200 used by the video compression and transmission system 100 may be advantageous over prior art compression techniques. The reconstructed image quality produced by the video compression and transmission system 100 is better than that of prior art implementations. Further, the video compression and transmission system 100 may be adapted to wireless transmissions.

Figure 3:
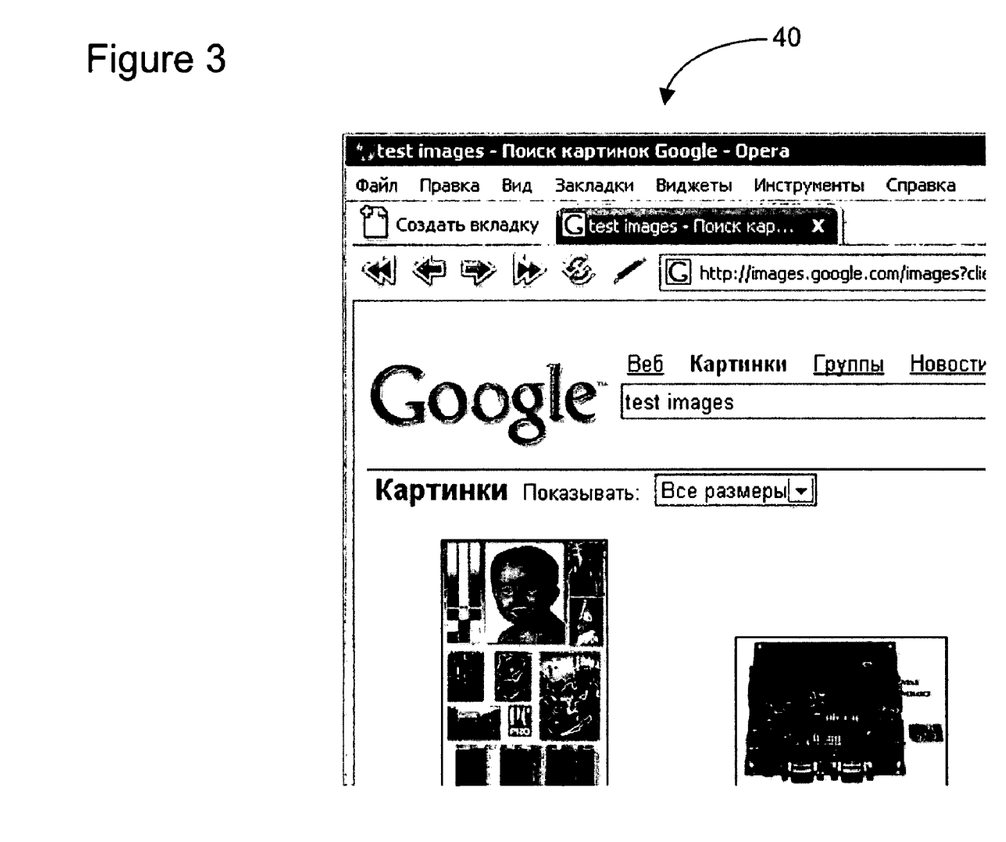
FIG. 3 is a fragment of test video sequence.
Figure 4:
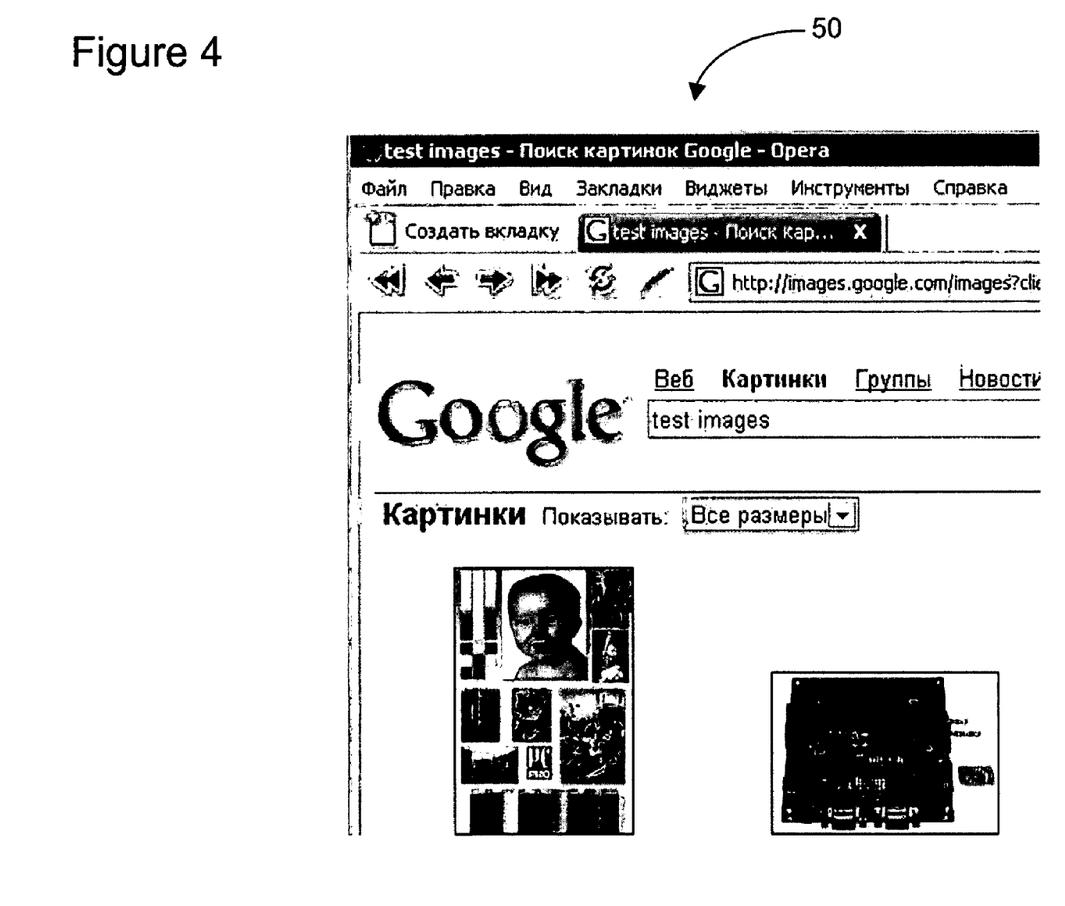
FIG. 4 is a fragment of reconstructed test video sequence, compressed prior to transmission using a prior art JPEG 2000 technique, according to some embodiments.
Figure 5:
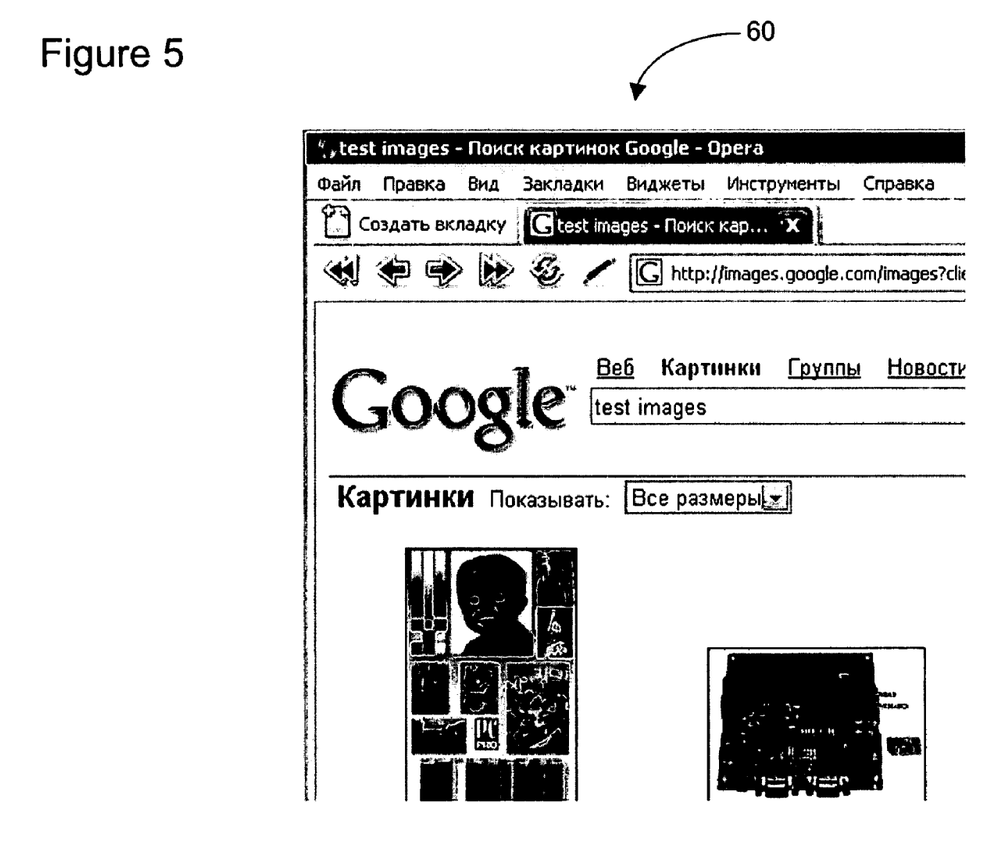
FIG. 5 is a fragment of reconstructed test video sequence, compressed prior to transmission using the video compression and transmission system of FIG. 1, according to some embodiments.

Empirical results using the video compression and transmission system 100 are illustrated in FIGS. 3-5, according to some embodiments. The image 40 of FIG. 3 is a fragment of an original video sequence (1024×768 frame, 30 frames per second). This original video sequence is first compressed with an original JPEG 2000 with a tile size of 256×16 at a channel rate of 37.7 Mbits/sec (FIG. 4). Next, this original video sequence is compressed with the video compression and transmission system 100 with a 50 kB transmit buffer size, with a tile size of 256×16 and a channel rate of 37.7 Mbits/sec (FIG. 5).

Figure 6:
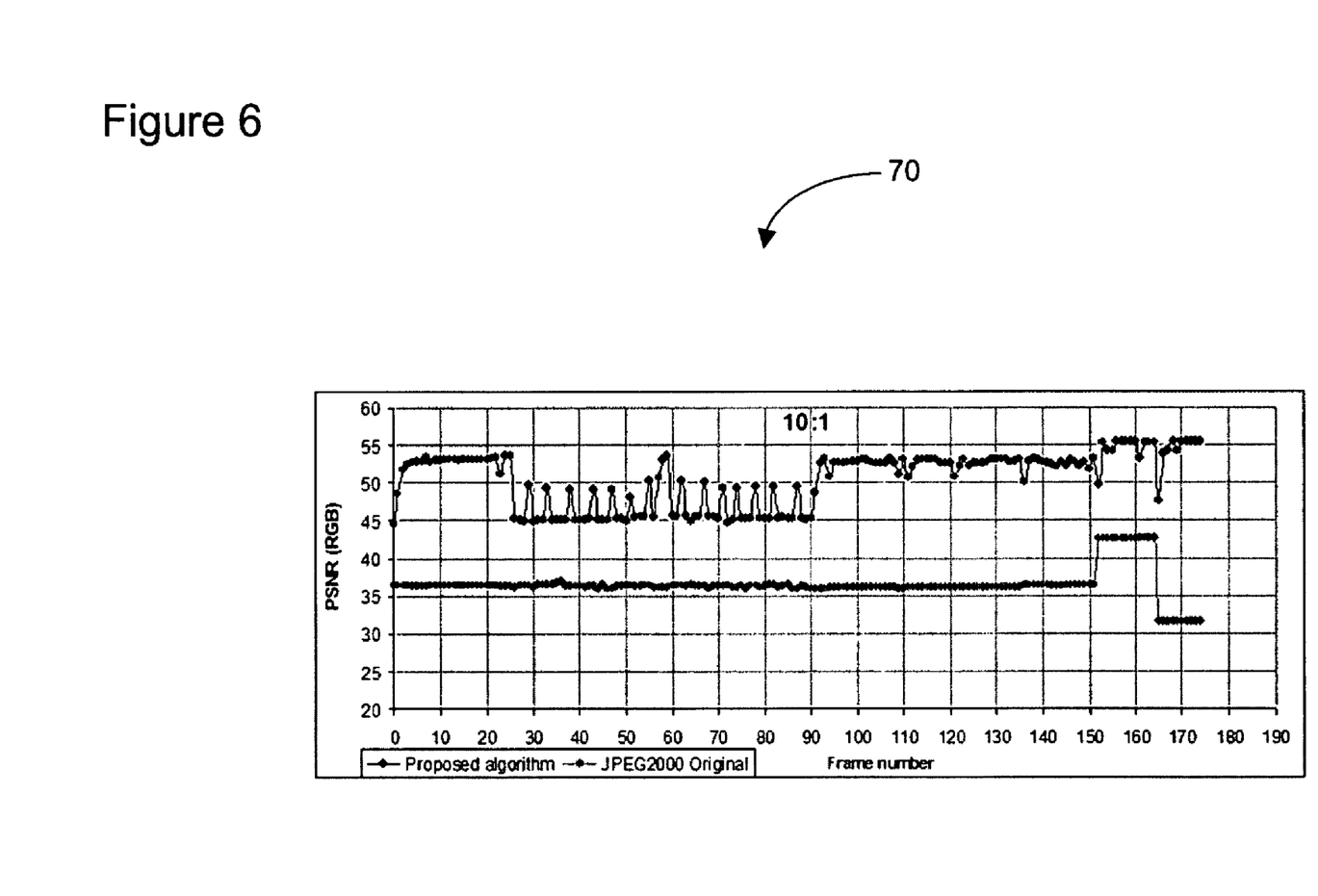
FIG. 6 is a comparative PSNR/frame graph for a channel rate of 56.6 Mbits/sec, according to some embodiments.
Figure 7:
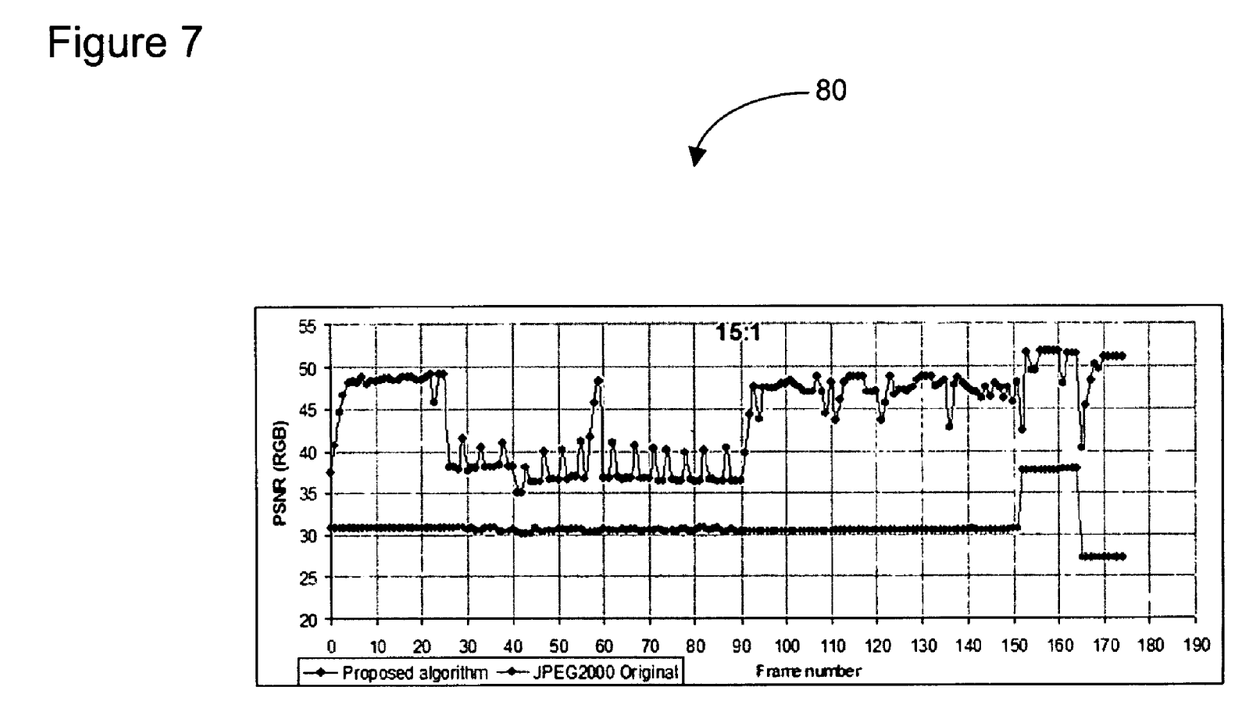
FIG. 7 is a comparative PSNR/frame graph for a channel rate of 37.7 Mbits/sec, according to some embodiments.
Figure 8:
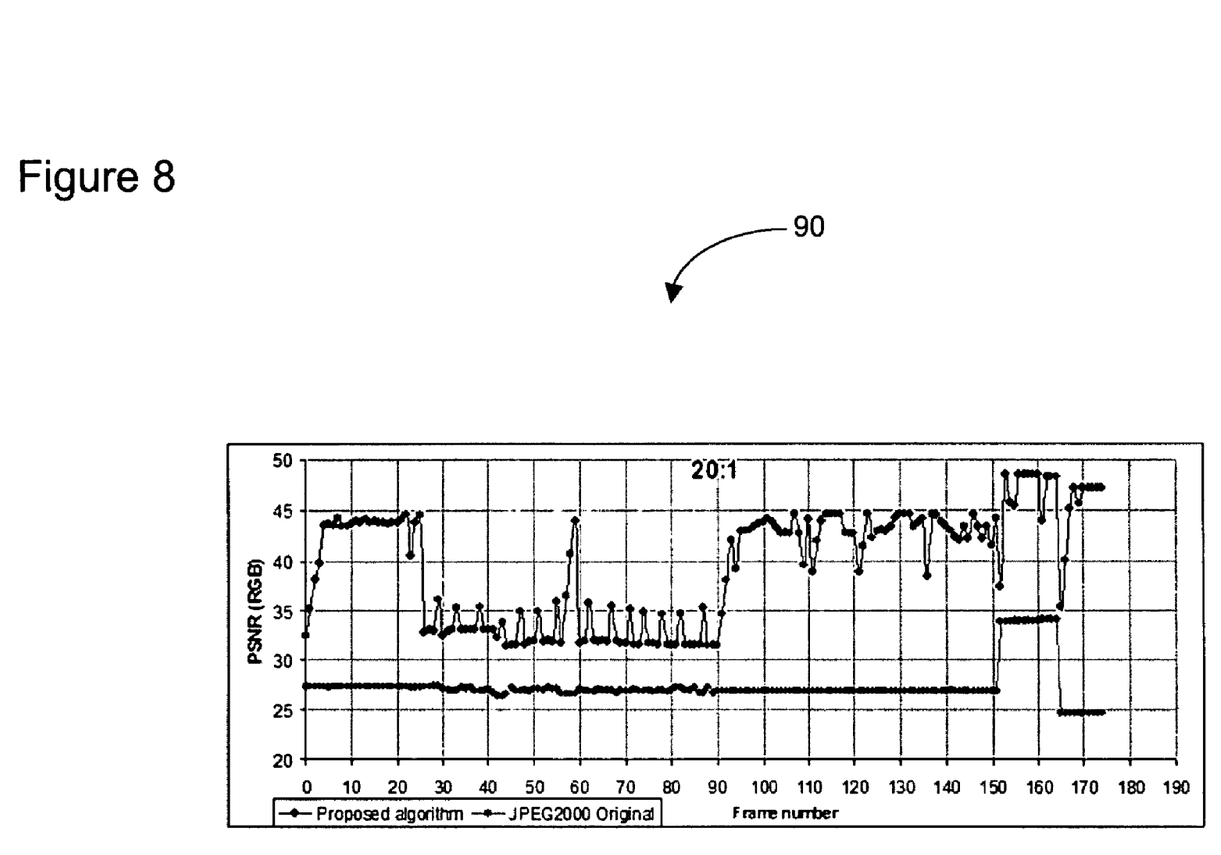
FIG. 8 is a comparative PSNR/frame graph for a channel rate of 28.3 Mbits/sec, according to some embodiments.

The graphs of FIGS. 6-8 demonstrate how the peak signal-to-noise ratio (PSNR) depends on the frame number of the video sequence for different channel rates. FIG. 6 corresponds to a channel rate of 56.6 Mbits/sec. FIG. 7 corresponds to a channel rate of 37.7 Mbits/sec. FIG. 8 corresponds to a channel rate of 28.3 Mbits/sec. PSNR is a metric of visual quality. FIGS. 6-8 show that the video compression and transmission system 100 is better than the original JPEG2000 rate-control scheme, because the PSNR for all frames is better in the former than in the latter, for different channel throughputs and memory restrictions.

Thus, the novelty of the video compression and transmission system 100 is the strategy of controlling the transmit buffer 36 (FIG. 1), which is useful for systems with memory restrictions on the transmitter side. The video compression and transmission system 100 further orients to worst tile quality maximization.

While the application has been described with respect to a limited number of embodiments, those skilled in the art will appreciate numerous modifications and variations therefrom. It is intended that the appended claims cover all such modifications and variations as fall within the true spirit and scope of the invention.

I claim:

1. A video compression and transmission system comprising:
    a static tile detector to:
        receive an input tile from a video source; and
        determine whether the input tile is static or non-static, by comparing current tile hash-function value with a hash-function value of a corresponding tile from a previous frame;
    a rate-distortion controller to determine compression parameters for the input tile, the input tile comprising an integer number of code blocks, the rate-distortion controller further comprising a rate-distortion algorithm, the rate-distortion algorithm to:
        search for a truncation vector $x_t$, so that $$\begin{cases} r(x_t) = \min_{\{n\}} r(n) \\ d(x_t) \le d_{lossless} \end{cases},$$

where n={$n_i$} is a truncation vector, where $n_i$ signifies that the $i^{th}$ block is truncated in the point number, $n_i$, and an overall tile distortion after the truncation is denoted as $$d(n) = \sum_i d_i^{n_i},$$

where the quantity, $d_i^{n_i}$, corresponds to the distortion value of $i^{th}$ block truncated in the point number, $n_i$ and a resulting tile rate is denoted as $$r(n) = \sum_i r_i^{n_i}$$

search for a second truncation vector, $y_t$ so that $$\begin{cases} r(y_t) = \min_{\{n\}} r(n) \\ d(y_t) \le \hat{d}(t) \end{cases};$$

wherein the truncation vectors $x_t$ and $y_t$ are used to generate the compression parameters; and
    an encoder to:
        receive the input tile and compression parameters;
        generate a compressed tile; and
        store the compressed tile in a transmit buffer;
wherein the compressed tile is transmitted across a channel to a receiver.

2. The video compression and transmission system of claim 1, the static tile detector to execute a static optimization algorithm if the input tile is deemed static.

3. The video compression and transmission system of claim 2, wherein the static optimization algorithm:
    copies the previously received tile; and
    sends the copy of the previously received tile to the rate-distortion controller;
wherein the transmit buffer is emptied.

4. The video compression and transmission system of claim 2, wherein the static optimization algorithm:
    transmits the tile to the rate-distortion controller with $d_{lossless}$ distortion.

5. The video compression and transmission system of claim 1, further comprising:
    a number of levels detector to determine whether the input tile is a desktop tile or a video tile, the number of levels detector comprising:
        a first encoder comprising one level; and
        a second encoder comprising three levels;
wherein the first encoder is used when the input tile is a desktop tile and the second encoder is used when the input tile is a video tile.

6. The video compression and transmission system of claim 1, wherein the rate-distortion algorithm further:

computes a number of bits needed to transmit the input tile with distortion, $d_{empty}$, by searching for a vector for $y_t$, that satisfies the following equation:

$$\begin{cases} r(y_t) = \min_{\{n\}} r(n) \\ d(y_t) \leq d_{empty} \end{cases}.$$

7. The video compression and transmission system of claim 6, wherein the rate-distortion algorithm further: searches for a third truncation vector, $z_t$, that satisfies the following equation:

$$\begin{cases} d(z_t) = \min_{\{n\}} d(n) \\ r(z_t) \leq \min(B_0 - b(t), r(y_t)) \end{cases}.$$

8. The video compression and transmission system of claim 1, wherein the rate-distortion controller uses a number of bits in the transmit buffer to generate the compression parameters.

* * * * *